United States Patent
Korthny et al.

(10) Patent No.: US 8,700,898 B1
(45) Date of Patent: Apr. 15, 2014

(54) SYSTEM AND METHOD FOR MULTI-LAYERED SENSITIVE DATA PROTECTION IN A VIRTUAL COMPUTING ENVIRONMENT

(71) Applicants: Alex Korthny, Etrog (IL); Nir Barak, Karmi Yosef (IL); Amir Jerbi, Givatayim (IL)

(72) Inventors: Alex Korthny, Etrog (IL); Nir Barak, Karmi Yosef (IL); Amir Jerbi, Givatayim (IL)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/633,454

(22) Filed: Oct. 2, 2012

(51) Int. Cl.
*H04L 29/06* (2006.01)
*H04L 9/32* (2006.01)
*G06F 15/16* (2006.01)

(52) U.S. Cl.
USPC ........... 713/165; 713/155; 713/156; 713/175; 718/1; 726/6

(58) Field of Classification Search
None
See application file for complete search history.

(56) References Cited

U.S. PATENT DOCUMENTS

| | | | |
|---|---|---|---|
| 4,969,092 A | 11/1990 | Shorter | |
| 4,991,089 A | 2/1991 | Shorter | |
| 5,095,427 A | 3/1992 | Tanaka | |
| 6,496,847 B1 | 12/2002 | Bugnion | |
| 7,802,251 B2 | 9/2010 | Kitamura | |
| 7,961,722 B1 * | 6/2011 | Jankowski | 370/381 |
| 7,962,950 B2 * | 6/2011 | Choo et al. | 726/2 |
| 8,201,237 B1 | 6/2012 | Doane | |
| 8,443,440 B2 | 5/2013 | McGee | |
| 8,484,732 B1 | 7/2013 | Chen | |
| 8,528,070 B2 | 9/2013 | Stiekes | |
| 2005/0097534 A1 | 5/2005 | Clement | |
| 2005/0183143 A1 | 8/2005 | Anderholm | |
| 2006/0143359 A1 | 6/2006 | Dostert | |
| 2007/0106992 A1 | 5/2007 | Kitamura | |
| 2008/0086726 A1 | 4/2008 | Griffith | |
| 2008/0163211 A1 | 7/2008 | Mizuno | |
| 2008/0256533 A1 | 10/2008 | Ben-Yehuda | |
| 2009/0013149 A1 | 1/2009 | Uhlig | |
| 2009/0198809 A1 | 8/2009 | Goto | |
| 2009/0293056 A1 * | 11/2009 | Ferris | 718/1 |
| 2009/0300607 A1 * | 12/2009 | Ferris et al. | 718/1 |
| 2009/0307705 A1 | 12/2009 | Bogner | |
| 2010/0031339 A1 | 2/2010 | Minnen | |

(Continued)

OTHER PUBLICATIONS

Non-Final Office Action issued for U.S. Appl. No. 13/406,088, dated Oct. 7, 2013.

(Continued)

*Primary Examiner* — Cordelia Zecher
*Assistant Examiner* — Trang Doan
(74) *Attorney, Agent, or Firm* — Pillsbury Winthrop Shaw Pittman LLP

(57) ABSTRACT

Systems and methods for providing sensitive data protection in a virtual computing environment. The systems and methods utilize a sensitive data control monitor on a virtual appliance machine administering guest virtual machines in a virtual computing environment, wherein each of the guest virtual machines may include a local sensitive data control agent. The sensitive data control monitor generates encryption keys for each guest virtual machine which are sent to the local sensitive data control agents and used to encrypt data locally on a protected guest virtual machine. In this manner the data itself on the virtual (or physical) disc associated with the guest virtual machine is encrypted while access attempts are gated by a combination of the local agent and the environment-based monitor, providing for secure yet administrable sensitive data protection.

21 Claims, 5 Drawing Sheets

(56) References Cited

U.S. PATENT DOCUMENTS

| | | |
|---|---|---|
| 2010/0042720 A1 | 2/2010 | Stienhans |
| 2010/0125664 A1 | 5/2010 | Hadar |
| 2010/0125902 A1 | 5/2010 | Killian |
| 2010/0132016 A1 | 5/2010 | Ferris |
| 2010/0198972 A1 | 8/2010 | Umbehocker |
| 2010/0199037 A1 | 8/2010 | Umbehocker |
| 2010/0205304 A1 | 8/2010 | Chaturvedi |
| 2010/0287280 A1 | 11/2010 | Sivan |
| 2010/0299366 A1 | 11/2010 | Stienhans |
| 2010/0306463 A1 | 12/2010 | Nakamura |
| 2011/0022574 A1 | 1/2011 | Hansen |
| 2011/0047543 A1 | 2/2011 | Mohinder |
| 2011/0055378 A1 | 3/2011 | Ferris |
| 2011/0055714 A1 | 3/2011 | Vemulapalli |
| 2011/0072487 A1 | 3/2011 | Hadar |
| 2011/0138047 A1 | 6/2011 | Brown |
| 2011/0142053 A1 | 6/2011 | Van Der Merwe |
| 2011/0197065 A1 | 8/2011 | Stauth |
| 2011/0225582 A1 | 9/2011 | Iikura |
| 2012/0054486 A1* | 3/2012 | Lakkavalli et al. ........... 713/156 |
| 2012/0144005 A1 | 6/2012 | Quintard |
| 2012/0159469 A1 | 6/2012 | Laor |
| 2013/0097296 A1 | 4/2013 | Gehrmann |
| 2013/0263208 A1* | 10/2013 | Challa ............................... 726/1 |

OTHER PUBLICATIONS

Final Office Action issued for U.S. Appl. No. 13/405,973, dated Sep. 23, 2013.

Non-Final Office Action issued for U.S. Appl. No. 13/405,973, dated Apr. 1, 2013.

Final Office Action as issued for U.S. Appl. No. 13/406,088, dated Feb. 12, 2014.

* cited by examiner

SYSTEM AND METHOD FOR MULTI-LAYERED SENSITIVE DATA PROTECTION IN A VIRTUAL COMPUTING ENVIRONMENT

BACKGROUND

When users in virtual computing environments obtain guest virtual machines for their use, protection of sensitive data equal to or above that provided in a traditional computing environment is beneficial. However, because the user's data on the guest virtual machine exists in the cloud environment, certain security risks for sensitive data may be heightened. Data security policies internal to a cloud provider apply to the virtual machine environment only. Accordingly, an intruder may copy the guest virtual machine's virtual disc, mount it on a separate machine and attempt to access the data. Accordingly, the intruder is able to bypass the file protection rules that apply inside the running virtual machine.

BRIEF SUMMARY

Provided herein are systems and methods for providing sensitive data protection in a virtual computing environment. The systems and methods utilize a sensitive data control monitor on a virtual appliance machine administering to guest virtual machines in a virtual computing environment, wherein each of the guest virtual machines may include a local sensitive data control agent. The sensitive data control monitor generates encryption keys for each guest virtual machine which are sent to the local sensitive data control agents and used to encrypt data locally on a protected guest virtual machine. In this manner the data itself on the virtual (or physical) disc associated with the guest virtual machine is encrypted while access attempts are gated by a combination of the local agent and the environment-based monitor, providing for secure yet administrable sensitive data protection.

In an embodiment, there is provided a method for providing sensitive data protection in a virtual computing environment, the method executed by a processing device configured to perform a plurality of operations, the method comprising: activating a guest virtual machine in the virtual computing environment, wherein the guest virtual machine comprises a local sensitive data control agent, wherein the guest virtual machine is associated with a virtual appliance machine that administers sensitive data controls for the virtual computing environment, and wherein the virtual appliance machine comprises a sensitive data control monitor; generating a certificate that uniquely identifies the guest virtual machine; identifying, at the sensitive data control monitor, a sensitive data protection policy for the guest virtual machine; associating, at the sensitive data control monitor, an encryption key with the certificate, wherein the encryption key is generated in accordance with the identified sensitive data protection policy; and passing the generated encryption key, the sensitive data protection policy, and the certificate from the virtual appliance machine to the guest virtual machine, wherein sensitive data stored by the guest virtual machine is encrypted on a virtual disc of the guest virtual machine using the generated encryption key and the sensitive data protection policy and encryption of the sensitive data is maintained when the guest virtual machine is deactivated.

In an embodiment, there is provided a system to provide sensitive data protection in a virtual computing environment, the system comprising: a processing device configured to: activate a guest virtual machine in a virtual computing environment, wherein the guest virtual machine comprises a local sensitive data control agent, wherein the guest virtual machine is associated with a virtual appliance machine that administers sensitive data controls for the virtual computing environment, and wherein the virtual appliance machine comprises a sensitive data control monitor, generate a certificate that uniquely identifies the guest virtual machine, identify, at the sensitive data control monitor, a sensitive data protection policy for the guest virtual machine, associate, at the sensitive data control monitor, an encryption key with the certificate, wherein the encryption key is generated in accordance with the identified sensitive data protection policy, and pass the generated encryption key, the sensitive data protection policy, and the certificate from the virtual appliance machine to the guest virtual machine, wherein sensitive data stored by the guest virtual machine is encrypted on a virtual disc of the guest virtual machine using the generated encryption key and the sensitive data protection policy and encryption of the sensitive data is maintained when the guest virtual machine is deactivated.

In an embodiment, there is provided a computer-readable medium having computer-executable instructions thereon that, when executed by a processing device, configure the processing device to perform a method for providing sensitive data protection in a virtual computing environment, the method comprising: activating a guest virtual machine in a virtual computing environment, wherein the guest virtual machine comprises a local sensitive data control agent, wherein the guest virtual machine is associated with a virtual appliance machine that administers sensitive data controls for the virtual computing environment, and wherein the virtual appliance machine comprises a sensitive data control monitor; generating a certificate that uniquely identifies the guest virtual machine; identifying, at the sensitive data control monitor, a sensitive data protection policy for the guest virtual machine; associating, at the sensitive data control monitor, an encryption key with the certificate, wherein the encryption key is generated in accordance with the identified sensitive data protection policy; and passing the generated encryption key, the sensitive data protection policy, and the certificate from the virtual appliance machine to the guest virtual machine, wherein sensitive data stored by the guest virtual machine is encrypted on a virtual disc of the guest virtual machine using the generated encryption key and the sensitive data protection policy and encryption of the sensitive data is maintained when the guest virtual machine is deactivated.

It is to be understood that both the foregoing general description and the following detailed description are exemplary and not restrictive of the scope of the invention.

DETAILED DESCRIPTION

The systems and methods provided herein utilize multiple security layers to protect sensitive information stored within virtual machines from unauthorized access. Not only is protection from within running virtual machines used, but sensitive data is protected outside of the virtual machine environment (i.e., offline protection) for instances wherein, for example, data is copied or moved from one virtual machine to another. Furthermore, traditional sensitive data protection is non-transparent, and in some instances, users need to be aware of protection schemes and specific user associated data for enforcement to occur. Accordingly, the sensitive data protection provided herein combines internal data protection with transparent protection from unauthorized access attempts originating outside an original virtual machine. Additionally, methods for sharing sensitive data on virtual discs with other trusted virtual machines are enabled.

Accordingly, the systems and methods provided herein enable "data level" protection that allows authorized users only to access the sensitive data located on their associated virtual machines in a transparent manner, without modifying applications or prompting for any user-specific credentials. Furthermore, the protected sensitive data is inaccessible from outside its original virtual machine even when the original virtual machine is taken offline and access attempts are made (e.g., someone attempts to manually mount the virtual disc containing the sensitive data). Furthermore, in some implementations, sensitive virtual disc data can be made available to other virtual machines (i.e., those other than the original machine on which the sensitive data originated) if there is a desire or need for it. Such sharing of protected sensitive data may be limited to virtual machines predefined for such access.

The systems and methods provided herein enable protection of sensitive data in a multilayered fashion wherein sensitive data on a virtual machine is encrypted using the virtual machine's certificate and encryption keys. The sensitive data can be used on virtual machines that are authorized to access the data only. In some implementations, encryption keys used to protect sensitive data may be saved on a virtual monitor server and not the guest virtual machine, to prevent access to the keys by intruders to a virtual machine housing the sensitive data when the virtual machine is offline.

Figure 1:
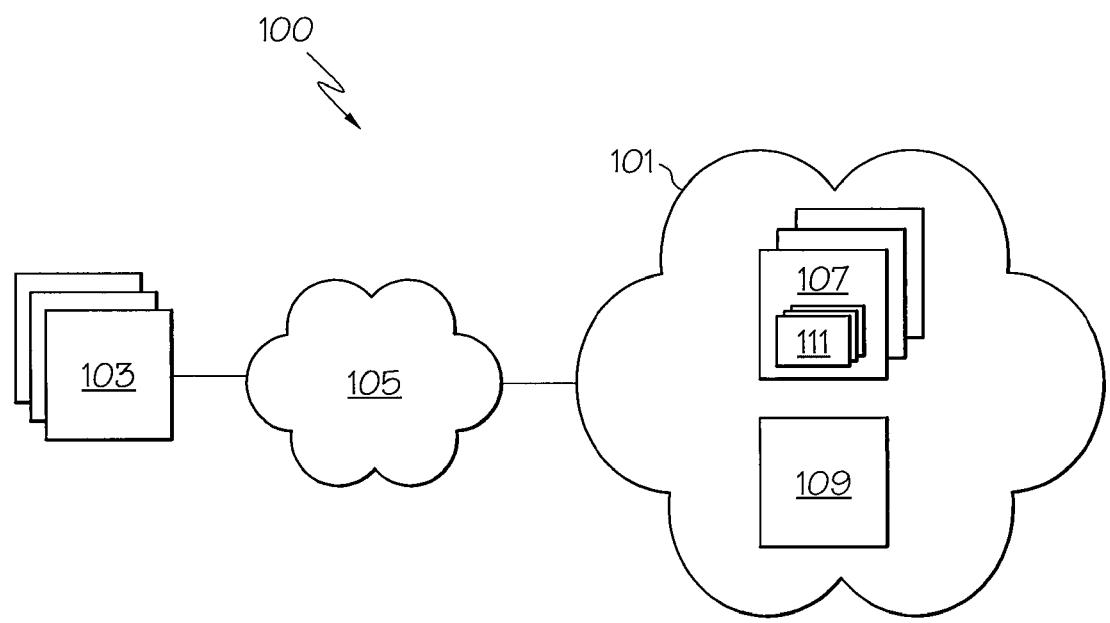
FIG. 1 is an illustration of an environment wherein an example system for providing sensitive data protection in a virtual computing environment resides, according to various implementations.

FIG. 1 illustrates an environment 100, which is an example of an environment wherein a system may reside for multilayered, encryption-based sensitive data protection in a virtual computing environment. In some implementations, environment 100 may include a cloud environment 101, one or more user devices 103, a network 105, and/or other elements. In some implementations, cloud environment 101 may be or include a virtualized computing environment wherein one or more services 111 are provided to one or more users at one or more user devices 103 over a network. In some implementations, cloud environment 101 may support one or more virtual machines 107 that provide the one or more services 111 to users accessing cloud environment 101. In some implementations, users (via user devices 103) may "check out" a virtual machine 107 from a pool of virtual machines. The virtual machine 107 may then be "returned" to the pool when no longer needed by the user.

In some implementations, cloud environment 101 may also include a virtual appliance machine 109 that may provide one or more oversight, control, and/or support features to one or more virtual machines 107 including support for sensitive data protection as described herein.

As discussed above, other services 111 are provided to consumers (operating one or more user devices 103) via virtual guest machines 107. Services 111 provided by an individual guest virtual machine 107 may be customized according to the needs of a given user such that a bundle or suite of applications or other services 111 may be provided to a user by a given guest virtual machine 107 and/or such that a given customized instance of an application 111 may be provided to a user by a given guest virtual machine 107 or by several guest virtual machines. Furthermore, guest virtual machine 107 may provide applications, media, data, or other services 111 that a user has loaded onto guest virtual machine 107. Accordingly, guest virtual machine 107 may provide storage and/or processing services to a user.

Virtual machines, including guest virtual machines and virtual appliance machines, may also be referred to as "images" that reside or are supported by a cloud or other virtualized computing environment. As used herein, the term "virtual machine" or "image" (e.g., guest virtual machine 107, virtual appliance machine 109) refers to a logically defined computing machine (as opposed to a physically defined computing machine) that may be identified by one or more logical characteristics but which in reality is composed of or supported by a static or dynamic set of one or more physical computing devices providing memory, processing power, or other computing features. A virtual machine is essentially an emulation of computing hardware (physical computing devices), wherein software is used to provide a computing environment that looks to users as a physical machine (such that users can utilize the storage and/or processing capabilities thereof). Accordingly, the actions performed by virtual machines described herein, including virtual appliance machine 109 and guest virtual machines 107, may be performed using one or more processing devices (e.g., microprocessors) of one or more physical computing machines supporting the virtual computing environment. Similarly, any data storage needs or actions relating thereto may be provided or facilitated by the memory devices (e.g., RAM, hard disc, EEPROM, flash memory, etc.) of one or more physical computing machines supporting the virtual computing environment. Furthermore, the term "cloud computing" or "cloud computing environment," may refer to a virtual computing environment supporting one or more virtual machines. Numerous virtualization environments or tools can be used to provide the virtual computing environment (i.e., cloud environments) described herein such as, for example, VMWare™ or Microsoft™ Hyper-V™ products.

As described herein, applications/services 111 are provided to users via guest virtual machines 107. As guest virtual machines 107 are virtual in nature, the ability to control and/or limit their use is different from that of physical machines. Accordingly, as described herein, in some implementations, virtual appliance machine 109 provides for control of certain aspects of guest virtual machines 107 within cloud environment 101 (e.g., administration of sensitive data protection).

In some implementations, a guest virtual machine 107 may be provided for the specific use of a user, or group of users. Through guest virtual machine 107, a user may utilize or interact with the one or more services 111 hosted thereon. As discussed above, in some implementations, guest virtual machine 107 may be provided with one or more applications or services 111 installed thereon. In some implementations, a user may install one or more applications/services 111 onto a guest virtual machine 107 provided by a provider of cloud environment 101.

In some implementations, a user may interact with guest virtual machine 107 via one or more of user devices 103. For example, a user device 103 may connect to cloud environment 101 via network 105 and therefore be provided with access to a specific guest virtual machine 107 that provides one or more services 111. In some implementations, user devices 103 may be or include one or more servers, desktop computers, laptop computers, tablet computers, hand-held computers, smart phones, cellular phones, personal digital assistants (PDAs), and/or other computing devices.

Network 105 may be or include the Internet or the World Wide Web ("www"). In some implementations, network 105 may be or include a switching fabric that is part of a Wide Area Network (WAN), a Local Area Network (LAN), or other types of networks known to those of ordinary skill in the art (e.g., a TCP/IP network). In some implementations, network 105 routes requests and/or other communication between cloud environment 101 and user devices 103. In some implementations, network 105 may use or include wired, wireless, optical, or other types of communication links.

Figure 3:
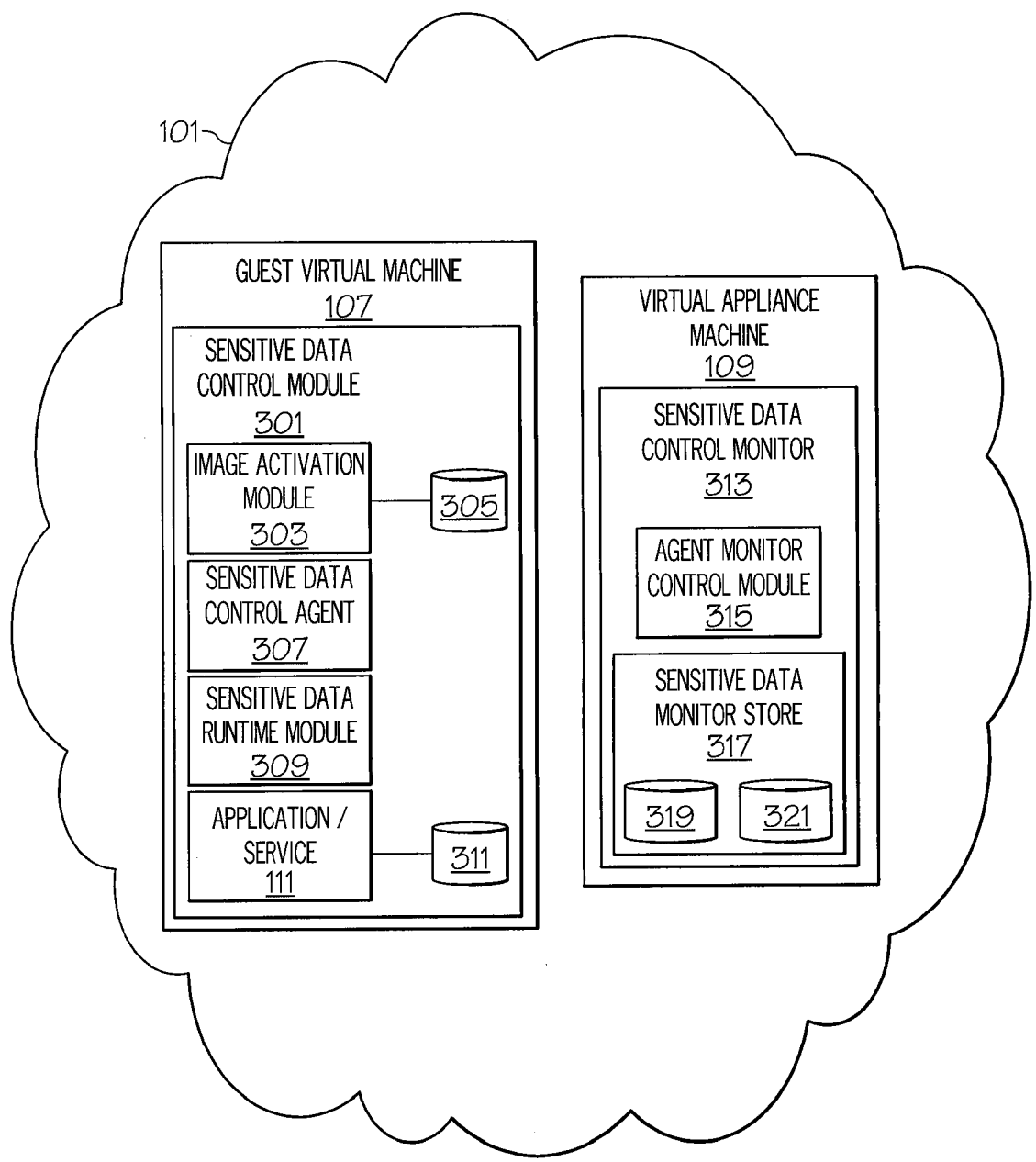
FIG. 3 is an illustration of an example system for providing sensitive data protection in a virtual computing environment, according to various implementations.

FIG. 3 illustrates an example of constituent components of cloud environment 101 that may be used in the systems and methods provided herein (including guest virtual machine 107 and virtual appliance machine 109) to provide sensitive data protection in a cloud computing environment.

In some implementations, guest virtual machine 107 may include one or more agents and/or modules that assist in sensitive data protection. For example, in some implementations, a virtual machine 107 in cloud environment 101 may include a sensitive data control module 301 that administers and controls sensitive data policies locally on guest virtual machine 107 (other guest virtual machines in cloud environment 101 may have their own sensitive data control modules).

Sensitive data control module 301 may include one or more sub-modules or sub-components that perform specific duties with respect to sensitive data control. For example, in some implementations, sensitive data control module 301 may include an image activation module 303. Image activation module 303 may oversee activation of guest virtual machine 107. Upon activation of guest virtual machine 107, image activation module 303 may apply assigned protection policies to guest virtual machine 107. As policy maintenance is handled by sensitive data control monitor 313, image activation module 303 may receive an appropriate protection policy from sensitive data control monitor 313 for application to guest virtual machine 107. The protection policy for a guest virtual machine dictates how data is protected in the guest virtual machine 107. When sensitive data is designated in guest virtual machine 107, it is protected according to the protection policies assigned to guest virtual machine 107. In some implementations, a protection policy may comprise a set of conditions to enable access to sensitive data stored on a protected volume (e.g., guest virtual machine 107) with respect to accessor identity, protected volume network location, environment (e.g., set of running applications, presence or absence of suspicious processes, etc.) and/or other factors that may limit or restrict access to sensitive data.

Sensitive data control module 301 may also include a local certificate store 305 that may store the certificate created for guest virtual machine 107. As discussed herein the certificate for a given guest virtual machine 107 includes a unique identifier for the guest virtual machine 107 that is used by virtual appliance machine 109 to administer protection policies and encryption keys. The certificate for a given guest virtual machine 107 may serve as a token of trust between sensitive data control monitor 313 and sensitive data control module 301. The certificate may also serve as a container for generated encryption keys (e.g., keys may be part of the certificate file). In some implementations, keys may be located external to the certificate and the certificate may be used to locate the appropriate keys. In some implementations, because each guest virtual machine 107 has their own unique certificate, sensitive data can be protected against unauthorized access originating outside of its original guest virtual machine 107 (i.e., because no other machine will have the certificate and therefore will not be able to access the appropriate encryption key).

In some implementations the certificate may be associated, at sensitive data control monitor 313, with a specific network address or location (or other parameter) such that a certificate originating from a location/address (or a machine having a parameter) other than that associated with that particular certificate on sensitive data control monitor 313 will be identified as improper. Accordingly, if the sensitive data and the certificate of guest virtual machine 107 is copied, a machine requesting the encryption key associated with that certificate (to decrypt the sensitive data) from sensitive data control monitor 313, will be recognized as improper due to the request originating from a location/address other than that associated with the certificate.

Sensitive data control module 301 may also include a sensitive data control agent 307 which may administer protection of sensitive data (and/or other parts of guest virtual machine 107) when activation of guest virtual machine 107 is complete. In some implementations, sensitive data control agent 307 receives protection policies from virtual appliance machine 109 (e.g., a sensitive data control monitor 313). These protection policies may be used by sensitive data control agent 307 for internal control (i.e., internal to guest virtual machine 107) of sensitive data along with encryption key(s) associated with the certificate for guest virtual machine 107 (i.e., for encrypting sensitive data for offline control). In some implementations, sensitive data control agent 307 may also accept requests from authorized users of the guest virtual machine 107 to change the protection policy with respect to internal and external (e.g., access by other virtual machines/data sharing) sensitive data access. In some instances, a protection policy may be changed for numerous reasons. For example a protection policy may be changed to reflect a change in the status of a user that the protection policy is associated with (e.g., the user is promoted to a position within an organization that entails greater access to data). In another example a protection policy may be changed when a change is made to the status of sensitive data that the protection policy is associated with (e.g., protected data is changed from a classification of "top secret" to a less restrictive classification of "limited access").

In some implementations, sensitive data control module 301 may include a sensitive data runtime module 309. Sensitive data runtime module 309 may grant access to sensitive data encryption on the virtual disc of guest virtual machine 107 that is transparent to authorized users and the applications that access the sensitive data in the sense that these users and applications operate without knowledge or visible indication of the data protection/encryption scheme. Nevertheless, deviation from allowed courses of action will lead to denial of access or other reaction based on the protection policy applied to guest virtual machine 107. These applications may receive any necessary sensitive data in an unencrypted format and are oblivious to the status of the data on persistent storage devices. In some implementations, sensitive data control module 301 may work with sensitive data control agent 307 to retrieve stored encryption keys and protection policies so as to access sensitive data (these keys and policies may be derived from a policy store 319 and a certificate and key store 321 of the sensitive data control monitor 313 of virtual appliance machine 109).

In some implementations, virtual appliance machine 109 may include one or more agents and/or modules that assist in sensitive data protection on guest virtual machines 107 in cloud environment 101. For example, in some implementations virtual appliance machine 109 may include a sensitive data control monitor 313 that manages sensitive data administration for guest virtual machines 107 in cloud environment 101. In some implementations, sensitive data control monitor 313 may include one or more sub-modules or sub-agents that perform sensitive data protection administrative functions. For example, sensitive data control monitor 313 may include an agent monitor control module 315. Agent monitor control module 315 creates and maintains certificates and keys for guest virtual machines 107 as well as various protection policies for internal or external sensitive data protection. In some implementations, each guest virtual machine may be associated with a unique certificate that identifies the guest virtual machine. In some implementations, the certificate for a given guest virtual machine may identify other information other than the identity of a specific guest virtual machine (e.g., an address/location of the guest virtual machine), but may include indications of authorized users, associated policies, and/or other data. For the protection of sensitive data on a given guest virtual machine 107, the guest virtual machine's certificate may be tied to an encryption key that is required to access sensitive data on the guest virtual machine.

Sensitive data control monitor 313 may also include a sensitive data monitor store 317 which may store and manage protection policies (e.g., in a policy store 319). Sensitive data monitor store 317 may also store, on virtual appliance machine 109, certificates and their associated encryption keys (if allowed by policies and required for performance reasons) in a certificate and key store 321. The location of key storage may be a configurable option based on performance. For example, storage of keys on virtual appliance machine 109 only may result in higher security, while allowing caching of encryption keys on guest virtual machines 107 may enable higher performance results.

In some implementations, a protection policy used on a given guest virtual machine 107 may have component parts that utilize different encryption keys. In these instances, sensitive data monitor store 317 stores an association between the different encryption keys and the different parts of a stored policy. The use of different encryption keys for different sets of data (e.g., on a single guest virtual machine 107) may arise when a user needs access to a plurality of sensitive data sets each having a different access scope (e.g., a first set of data is "top secret" while a second set of data is "limited access."). Therefore data sets of differing access scope will be provided with a different, dedicated key.

In some implementations, guest virtual machine 107 and/or virtual appliance machine 109 may include other components as well. In some implementations, sensitive data control monitor 313 may be stored on and administered from other parts of cloud environment 101 than virtual appliance machine 109.

Figure 2A:
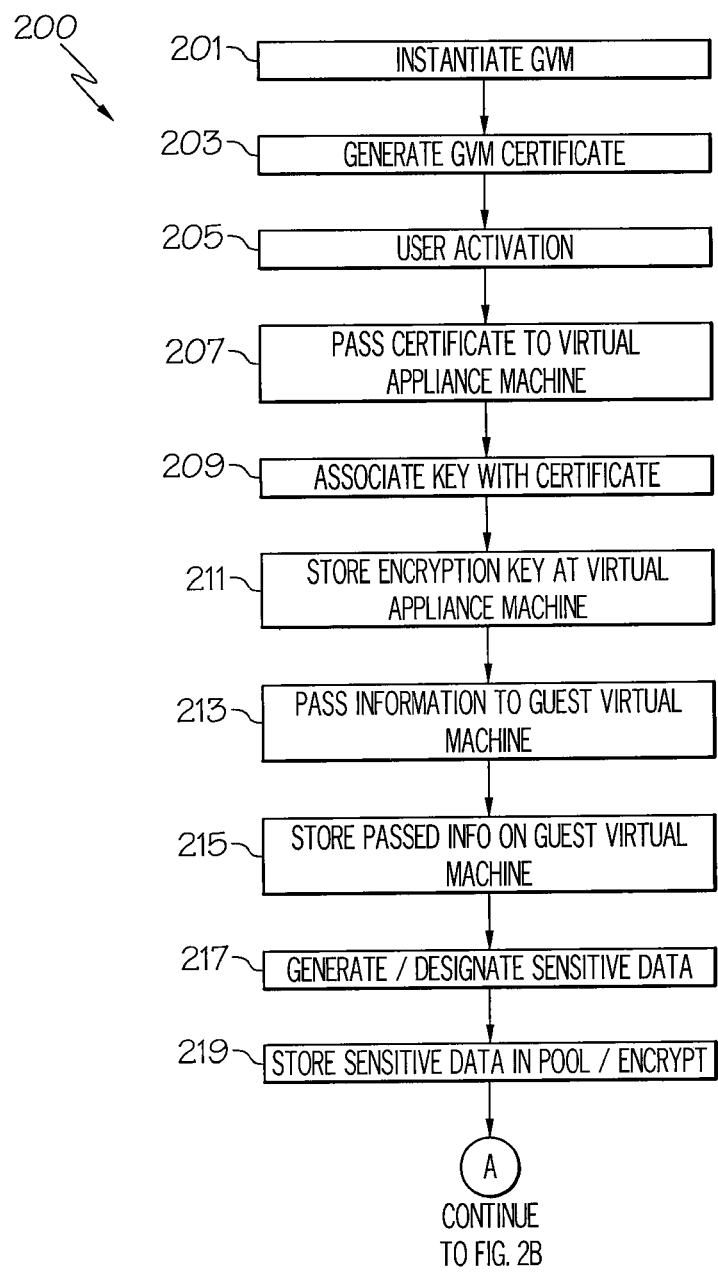
FIGS. 2A and 2B are an illustration of an example process for providing sensitive data protection in a virtual computing environment, according to various implementations.
Figure 2B:
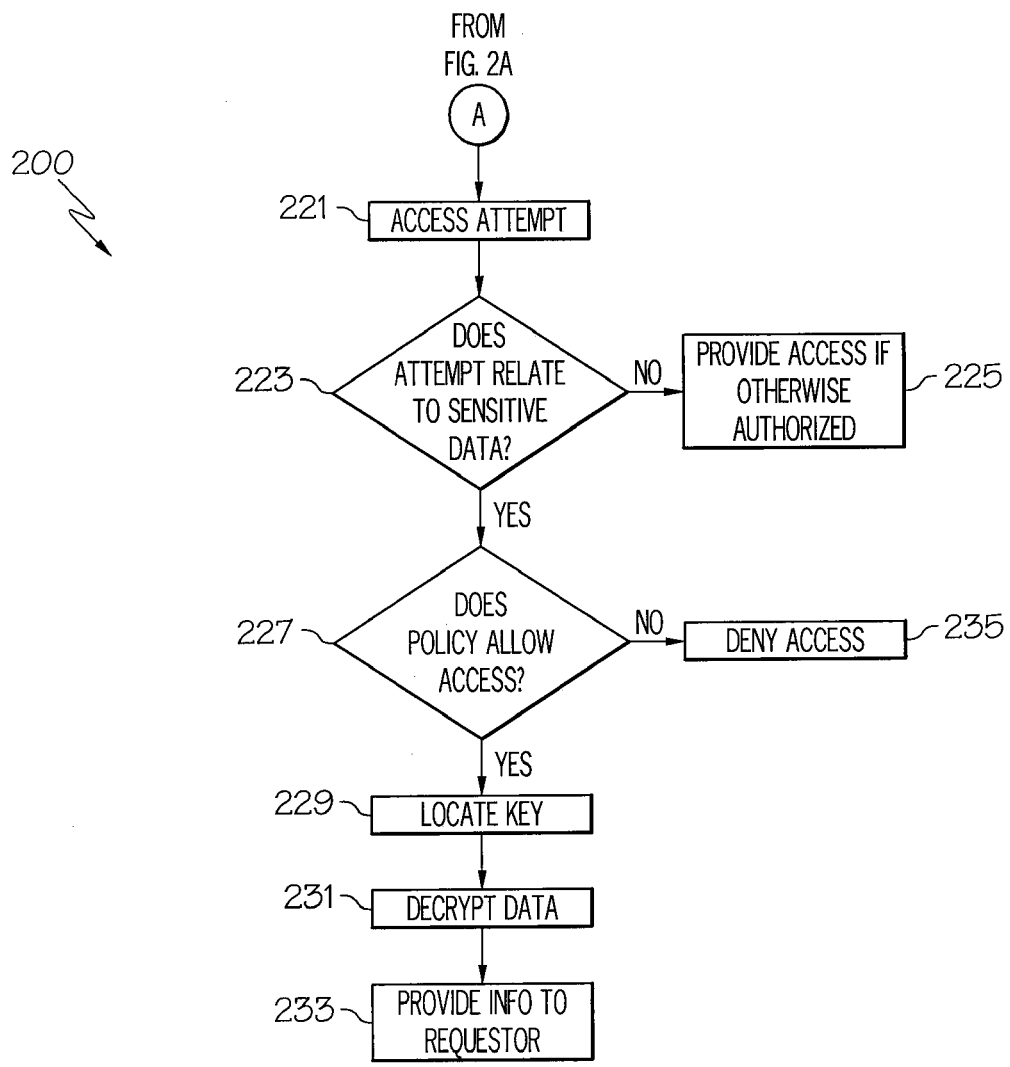

FIGS. 2A and 2B, illustrate a process 200, which is an example of a process for enabling sensitive data protection in a virtual computing environment. Process 200 may include an operation 201 wherein a guest virtual machine (GVM), e.g., guest virtual machine 107, may be instantiated in a virtual computing environment (e.g., cloud environment 101) for access or use by a user. In some implementations, the instantiated guest virtual machine includes a local sensitive data control agent (e.g., sensitive data control agent 301). If a sensitive data control agent is not located on the guest virtual machine, one may be installed thereon. The virtual computing environment may also include a virtual appliance machine (e.g., virtual appliance machine 109) that is associated with the guest virtual machine. In some implementations, the virtual appliance machine may include a sensitive data control monitor (e.g., sensitive data control monitor 313), or a sensitive data control monitor is otherwise present in or administered to the virtual computing environment.

In an operation 203, a certificate is generated for the guest virtual machine. In some implementations, the certificate may be generated by the sensitive data control monitor (e.g., sensitive data control monitor 313) and sent to the guest virtual machine (e.g., the sensitive data control module 301 on the guest virtual machine). As discussed herein, the certificate uniquely identifies the guest virtual machine. In an operation 205, the guest virtual machine may be activated by the user when the user is ready to utilize the guest virtual machine. Upon activation, the certificate for the guest virtual machine may be passed from the guest virtual machine to the virtual appliance machine in an operation 207. Specifically, in some implementations the certificate may be passed to the sensitive data control monitor of the virtual appliance machine. In some implementations, the certificate need not be passed from the guest virtual machine to the virtual appliance machine, as the certificate may be generated by and stored in, the virtual appliance machine when the guest virtual machine is instantiated or initialized.

In an operation 209, the sensitive data control monitor of the virtual appliance machine may associate an encryption key with the certificate. In some implementations this operation may include generating the encryption key. The encryption key may be unique such that it is not used for the encryption of data for other guest virtual machines or for other sensitive data. In some implementations, multiple encryption keys may be associated with a certificate. For example a protection policy applied to a guest virtual machine may classify more than one category of sensitive data. In this instance, a different encryption key may be used for each different category of sensitive data. Accordingly, the certificate associated with the guest virtual machine to which this protection policy is applied may be associated with multiple encryption keys, one for each different category of sensitive data. In some implementations, the protection policies may be based on comparing patterns of access to rules for protecting data (data protection rules) and what corrective should be taken upon detection of access attempts that violate the data protection rules.

In some implementations, certificates may be based on a private/public key scheme. In some implementations, an encryption key used for encrypting data may be a single symmetric key. As discussed herein in some implementations, more than one key may be used in instances wherein different sets of sensitive data exist.

In an operation 211, the generated encryption key(s) is stored by the sensitive data control monitor (e.g., in a sensitive data monitor store of virtual appliance machine). Accordingly, the virtual appliance machine (or other component that includes the sensitive data control monitor) that administers sensitive data protection for guest virtual machines in the cloud environment has a copy of the keys necessary for accessing sensitive data on the various guest virtual machines. Thus, if the guest virtual machines themselves are compromised, the sensitive data can be protected. Similarly, this centralized key administration enables access to the sensitive data from a separate guest virtual machine from where the sensitive data originates.

In an operation 213, one or more pieces of information may be passed from the virtual appliance machine to the guest virtual machine. In some implementations, the certificate may be passed to the guest virtual machine along with a protection policy to be applied to the guest virtual machine. In one example, an instance of a protection policy includes information relating to how to appropriately protect the sensitive data and therefore may vary based on the data to be protected. In some instances, a protection policy may include a list of access conditions for permissive access (e.g., access criteria that must be met before access is granted—if not met, access is limited or denied). This criteria may be configurable by a user or an administrator. In some instances, a protection policy or a data protection rule that a policy is based thereon may include information for post processing after access attempts (successful or unsuccessful). For example, a post processing step may include addition of a flag to information relating to an access event so that the event can be audited.

In some implementations, the encryption keys are passed to the guest virtual machine along with the certificate and the protection policy. In an operation 215, some or all of the passed information may be stored on the guest virtual machine. The certificate may be stored so that it can be passed back to the virtual appliance machine upon the occurrence of data access requests. The protection policy may be stored so that the guest virtual machine can be configured according to the parameters of the protection policy. In some implementations the passed encryption key(s) may be stored locally on the guest virtual machine so that the virtual appliance machine need not be contacted when sensitive data is to be decrypted. This local storage option may be a configurable option that exchanges efficiency (local storage) for maximum security (only storing keys on the virtual appliance machine).

In an operation 217, sensitive data is generated on the guest virtual machine. In some instances, the sensitive data may be generated by the user utilizing services on the guest virtual machine (i.e., utilizing applications vie the guest virtual machine). In some instances, the sensitive data may be uploaded or otherwise entered into the guest virtual machine by the user, by interaction with another machine, or otherwise loaded onto the guest virtual machine. In some implementations, data on the guest virtual machine may not be classified as sensitive until it is marked as such by a user or other entity. Accordingly, the "generation" of sensitive data may include the user marking data as sensitive. For example, in some implementations, the user of the guest virtual machine may define parameters relating to how sensitive data is defined. The parameters may include an indication of what data is considered sensitive, individuals that are to be granted access to data (e.g., so that other users can access the sensitive data using the original guest virtual machine or other authorized guest virtual machine), what other virtual machines are authorized to access the sensitive data, an indication that the sensitive data is not to be accessible in offline mode, and/or other parameters.

In an operation 219, the sensitive data is stored in a sensitive data pool on the virtual disc of the guest virtual machine. Accordingly, the sensitive data is segregated from other data on the disc and therefore access is restricted. The sensitive data pool may be created using the encryption keys passed to the guest virtual machine by the virtual appliance machine. As the data in the sensitive data pool is encrypted, it cannot be viewed or accessed in a meaningful way without decryption that uses the appropriate encryption key. As discussed herein multiple data pools with different sets of encrypted data may reside on the same guest virtual machine according to the protection policy applied to the guest virtual machine. Because the sensitive data is encrypted on the virtual disc of the guest virtual machine, the data remains encrypted even when the guest virtual machine is offline. Accordingly, any access to the disc by unauthorized users will not result in a security breach of the data because the data remains persistently encrypted.

In an operation 221, a data access attempt may occur. In some instances, the data access attempt may be detected at the guest virtual machine when a user or other entity is attempting to access data of the guest virtual machine. However, in some instances, the access attempt may occur at the sensitive data control monitor (e.g., when a copy of the guest virtual machine was made and started). In an operation 223, it may be determined whether the access attempt relates to data in the sensitive data pool. If the data does not reside in the sensitive data pool and the access attempt is otherwise authorized, access to the data may be granted in an operation 225. If the data does reside in the sensitive data pool, the access attempt is evaluated against the data protection policy applied at the guest virtual machine in an operation 227. If it is determined that the data access attempt is allowed according to the protection policy, the appropriate encryption key will be located in an operation 229. In some implementations, this may include the sensitive data control module of the guest virtual machine contacting the sensitive data control monitor of the guest virtual machine, providing its certificate to the sensitive data control monitor and receiving the associated encryption key from the sensitive data control monitor (e.g., assuming that the certificate and any associated parameters match those stored on the sensitive data control monitor). However, in some implementations, this may include accessing the appropriate encryption key locally stored on the guest virtual machine. In these instances, data is encrypted and the appropriate key may be stored in a protected part of the guest virtual machine's file system. As such, in offline mode it may not be easy for an intruder to find the key. Also, even if an intruder has the key, the intruder must still know how to use it to decrypt sensitive data. While a guest virtual machine is running, there may be access control rules and active interception to protect data during runtime.

In an operation 231, the encryption key is used to decrypt the relevant information which is provided to the requestor in an operation 233. If the access attempt is determined not to be approved in light of the protection policy in operation 227, the access attempt is denies in an operation 235. Coincident with the denial a log may be made of the denial which may be used for various reporting and/or alert features.

Figure 4:
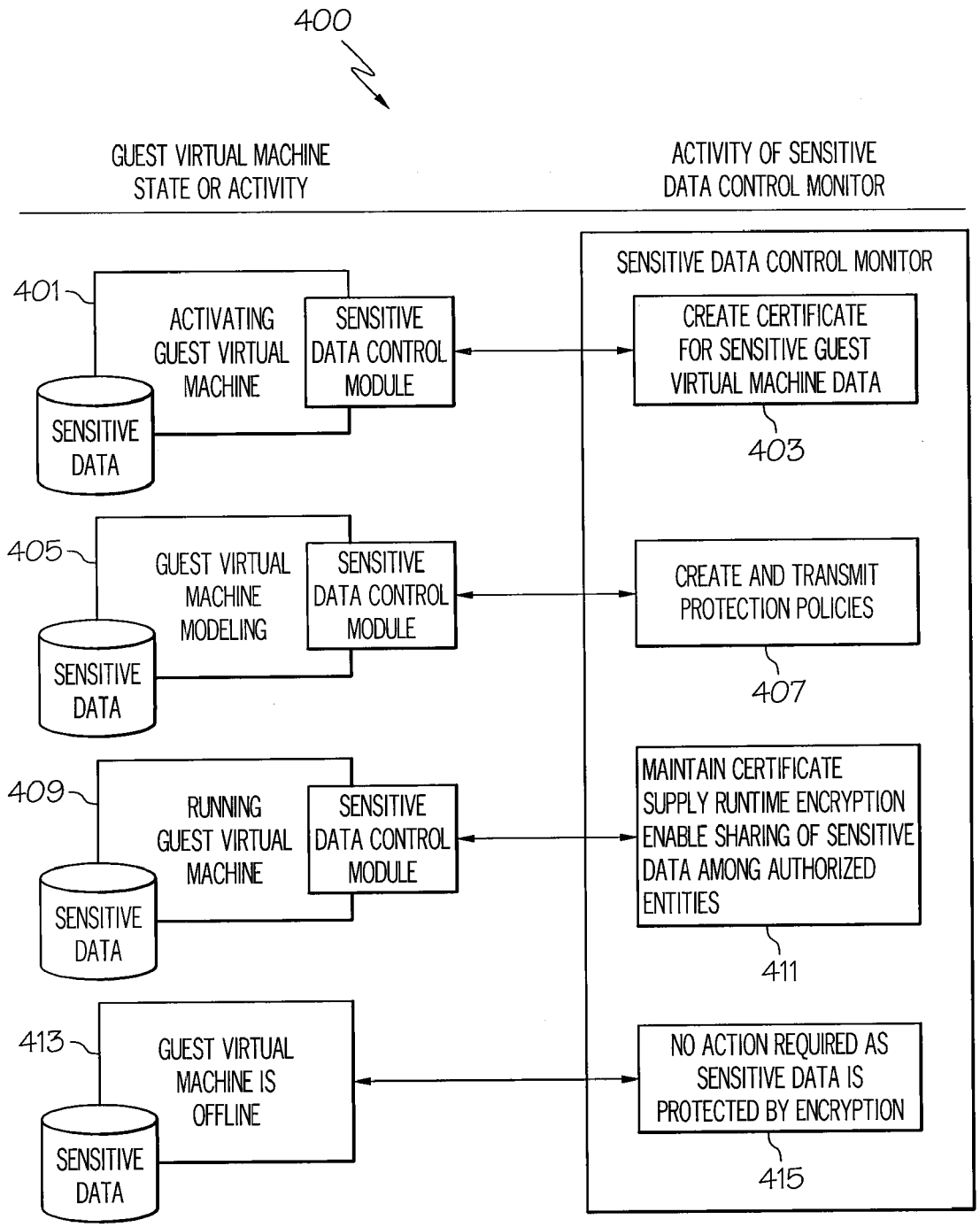
FIG. 4 is an illustration of an example state diagram illustrating activities of a sensitive data control monitor and a sensitive data control agent, according to various implementations.

As the systems and methods provided herein enable administration of sensitive data protection using encryption of data on a local disc of guest virtual machines and a cloud-environment-based sensitive data control monitor in conjunction with local sensitive data control modules, the systems and methods provide a protection scheme that not only operates in runtime but also when a guest virtual machine is offline. FIG. 4 illustrates a state diagram 400 that shows a state or activity of a guest virtual machine (e.g., a guest virtual machine 107 of environment 100) and the corresponding activities of the cloud environment-based sensitive data control monitor (e.g., sensitive data control monitor 313) during a given guest virtual machine state or activity. For example, when the guest virtual machine is being activated at activity 401, the sensitive data control monitor may perform various activities, including creating a certificate for the guest virtual machine in an activity 403. It should be noted that the sensitive data control monitor may interact with the sensitive data control module of the guest virtual machine (e.g., sensitive data control module 301 of guest virtual machine 107) during or subsequent to one or more of activities 401 and 403. For example, the created certificate may be provided to the guest virtual machine upon creation. As described herein, the certificate serves as a unique identifier for the guest virtual machine which provides data protection from imposter and copied machines.

When the guest virtual machine is undergoing a modeling state (e.g., getting the guest virtual machine ready for regular use, deciding what it needs to be used for, composing services/applications, setting up protection policies, etc.) in an activity 405, the sensitive data control monitor may perform various activities, including creating and providing protection policies to the guest virtual machine (via the sensitive data control module of the guest virtual machine) in an activity 407. As described herein, these policies define the parameters of sensitive data protection.

When the guest virtual machine is running during typical user in an activity 409, the sensitive data control monitor is performing various activities, including maintaining the guest virtual machine's certificate (e.g., getting new keys of needed, additional keys if needed to map a new encrypted data store, renewal of the certificate, etc.), supplying runtime encryption, enabling sharing of sensitive data among authorized machines, and/or other actions, in an activity 411. These and/or other actions may involve the sensitive data control module of the guest virtual machine and may provide runtime protection of sensitive data and/or or enable authorized sharing of such data.

The systems and methods provided herein also provide protection of sensitive data when the guest virtual machine is offline, as in activity 413. No activity 415 is needed by the sensitive data control monitor of the virtual appliance machine as the sensitive data is encrypted on the disc of the guest virtual machine.

As discussed herein, the systems and methods provided may be used to provide sensitive data protection in a virtual computing environment. For example, in some implementations, a user may receive authorization to use a guest virtual machine in a cloud environment (e.g., guest virtual machine 107 in cloud environment 101) from a provider of the cloud environment or other entity. Before the user stores sensitive data on the guest virtual machine, the user activates the guest virtual machine (e.g., by sending a message/indicator from a user device 103 to guest virtual machine 107 across network 105). See e.g., operation 205 of process 200. As discussed herein, this activation process may involve an image activation module (e.g., image activation module 303) applying a protection policy to guest virtual machine. Initially, upon activation by the user, in some implementations, the guest virtual machine may have a sensitive data control module (e.g., sensitive data control module 301) installed thereon. In some implementations, the sensitive data control module may be installed from a virtual appliance machine. However, in some implementations, the sensitive data control module may be installed from another component of a cloud environment or from outside of the cloud environment.

In some implementations, the guest virtual machine may have been instantiated from a template having a sensitive data control module installed thereon such that no subsequent installation of a sensitive data control module is necessary upon activation.

After activation has been initiated, the guest virtual machine triggers a call to a sensitive data control monitor of a virtual appliance machine (or other component of the cloud environment) that administers data protection for the guest virtual machine (e.g., a sensitive data control monitor 313 of guest virtual machine 109). In doing so, the guest virtual machine passes its local copy of its identifying certificate if the certificate has previously been generated (e.g., during instantiation or activation). See e.g., operation 207 of process 200. If the guest virtual machine does not already have its identifying certificate stored locally, the sensitive data control monitor (or other part of the virtual appliance machine) may create an identifying certificate for the guest virtual machine. The sensitive data control monitor may also generate one or more encryption keys to associate with the certificate of the guest virtual machine (see e.g., operation 209 of process 200). The sensitive data control monitor may also send back to the sensitive data control module of the guest virtual machine the certificate for guest virtual machine, the generated keys specific to the certificate, and any protection policies that are to be applied on the guest virtual machine (see e.g., operation 213 of process 200). Initially, templates for protection policies maybe generic and may be customized before or after distribution to guest virtual machines based on the data protection needs of the machine.

In some implementations, a sensitive data control agent (e.g., sensitive data control agent 307 of guest virtual machine 107) or other component of the guest virtual machine may locally store the certificate, the keys, and the policies received from the sensitive data control monitor (the sensitive data control monitor will also retain a copy of these items). See e.g., operation 215 of process 200. In some implementations, the encryption keys may only be stored only by the sensitive data control monitor and therefore they will not be present on the guest virtual machine. In some implementations, whether or not the encryption keys associated with a guest virtual machine's certificate will be stored locally with the machine may be dictated by the particular protection policy applied to the guest virtual machine.

During or after initialization of the guest virtual machine, a sensitive data runtime module (e.g., sensitive data runtime module 309) may be initialized by the sensitive data control module of the guest virtual machine. The sensitive data runtime module may then encrypt any data that is considered sensitive using the encryption keys and protection policy that the sensitive data control module received from sensitive data control monitor (see e.g., operation 219 of process 200). Data may be considered sensitive (and therefore may be encrypted) based on any number of schemes, method such as, for example, a preset best practice template, manual marking as sensitive by users/administrators, using third party content analysis software, and/or using other methods or tools. In some implementations, the sensitive data runtime module may require its own protection so that it does not become corrupted or otherwise compromised. Accordingly, protection policies may be defined on the guest virtual machine for the sensitive data runtime module itself.

The startup of additional guest virtual machines in the cloud environment are typically not hindered by the actions of the sensitive data control module or the sensitive data control monitor because vital operating system (OS) components of the guest virtual machine may be commonly available and therefore need not be encrypted as they have no information value to be targeted as sensitive data.

When the guest virtual machine is started the sensitive data control agent (e.g., sensitive data control agent 307) is invoked. It is noted that "starting" a guest virtual machine may be considered different from initialization of the guest virtual machine. Starting refers to a virtual machine start event indicating the guest virtual machine has been "powered on" and has started to execute its code. Initialization may relate to an initialization event associated with the systems described herein for sensitive data protection, meaning that the code for a sensitive data control monitor or a sensitive data control module has been invoke and initialized. Initialization may relate to encrypting sensitive data and activating sensitive data runtime module (e.g., sensitive data runtime module 309); i.e., it is initialization of the security components, not of the guest virtual machine itself.

The sensitive data control agent validates the current execution environment against information stored on its certificate from the sensitive data control monitor (e.g., sensitive data control monitor 313 of virtual appliance machine 109). Validation of the execution environment may refer to validating details of the guest virtual machines such as, for example, its virtual machine identification, a logged on user's identification, identification of running processes on the guest virtual machine, a network location of the guest virtual machine (i.e., a network segment that the guest virtual machine belongs to), and/or other details. This validation ensures that the guest virtual machine is not an unauthorized copy and/or being run on an unintended environment. This validation may also occur at other times so as to ensure the guest virtual machine is authentic and uncorrupted.

During a data access event, the sensitive data runtime module first determines whether the data to which access is requested is part of a sensitive data pool (see e.g., operation 223 of process 200). If the data to which access is requested is part of the sensitive data pool, the protection policy applied to the guest virtual machine is checked (see e.g., operation 227 of process 200). The check may include a local (i.e., on the guest virtual machine) check to see if an accessing entity's identity matches an allowed user's identity such that the protection policy can allow or prevent access based on the check. The sensitive data control agent (or other part of sensitive data control module of the guest virtual machine) may retrieve the encryption keys for the guest virtual machine's associated certificate (see e.g., operation 229 of process 200) from the sensitive data control monitor (or form a local store, if permitted by the protection policy of the guest virtual machine) and activates the sensitive runtime module (e.g., sensitive data runtime module 309). If allowed, in-memory decryption will then be performed by the sensitive data runtime module so the data can be properly accessed (see e.g., operation 231 of process 200). In some implementations, if access is denied based on the protection policy, an action may be taken (an audit record may be generated). See e.g., operation 235 of process 200.

The sensitive data control agent may periodically check the protection policy associated with the guest virtual machine to determine whether it has changed (policies may change, for example, when such changes have been deemed necessary to improve security performance).

As described herein, the systems and methods provided herein may be used to provide offline sensitive data protection in a virtual computing environment. For example, in some instances, a user may request a guest virtual machine (e.g., guest virtual machine 107) from a cloud provider of a cloud environment (e.g., cloud environment 101). The cloud provider may then instantiate or otherwise set up the guest virtual machine for the user. The user may then activate the guest virtual machine (see e.g., operation 205 of process 200), which leads to the activation of a sensitive data runtime module on the guest virtual machine (e.g., sensitive data runtime module 309) which begins monitoring of data access attempts/requests (see e.g., operation 221 of process 200). The user may then begin using the guest virtual machine, whereupon the guest virtual machine may accumulate sensitive data thereon (see e.g., operation 217 of process 200). An unauthorized user (e.g., an attacker) may then gain access to the guest virtual machine. For example, the unauthorized user may access a virtual disc of the guest virtual machine, copy it, mount it offline, and may try to access the sensitive data. Because the sensitive data is encrypted on the guest virtual machine's disc, the unauthorized user will not be able to retrieve useful information from the data as the data is encrypted.

In some instances, the systems and methods described herein may protect sensitive data from unauthorized access attempts using different guest virtual machines. For instance, a user may request a guest virtual machine (e.g., guest virtual machine 107) from a cloud provider in a cloud environment (e.g., cloud environment 101). The cloud provider instantiates or otherwise sets up a guest virtual machine (e.g., guest virtual machine 107) with a sensitive data control module (e.g., sensitive data control module 301) for the user (see e.g., operation 201 of process 200). The user may then activate the guest virtual machine 107 (see e.g., operation 205 of process 200), which leads to the activation of the sensitive data runtime agent which begins monitoring of data access attempts/requests (see e.g., operation 221 of process 200). The user may then begin using the guest virtual machine, whereupon the guest virtual machine may accumulate sensitive data thereon (see e.g., operation 217 of process 200). This data may be encrypted as described herein.

In some instances, an unauthorized user (e.g., an attacker) may access a virtual disc of the guest virtual machine, copy it, mount it offline, and because it cannot be used/mounted offline (because the data is encrypted as discussed above), the unauthorized user may attempt to mount the disc on a second guest virtual machine (see e.g., operation 221 of process 200) in a different virtual environment. However, even if the second guest virtual machine is controlled by the same sensitive data control monitor, the sensitive data on the disc cannot be decrypted, because the second guest virtual machine has a different certificate. Accordingly, if this different certificate is passed to a sensitive data control monitor of the cloud environment, the appropriate keys will not be able to be retrieved because different keys will be associated with the second guest virtual machine. These different keys will not be able to decrypt the sensitive data from the original guest virtual machine.

The systems and methods described herein may also be used to provide authorized access to sensitive data from a guest virtual machine that is not used to create the sensitive data. For example, a user may request a guest virtual machine (e.g., guest virtual machine 107) from a cloud provider in of a cloud environment (e.g., cloud environment 101). The cloud provider may instantiate or otherwise set up the guest virtual machine with a sensitive data control module (e.g., sensitive data control module 301) for the user (see e.g., operation 201 of process 200). The user may then activate the guest virtual machine (see e.g., operation 205 of process 200), which leads to the activation of a sensitive data runtime agent (e.g., sensitive data runtime agent 309) which begins monitoring of data access attempts/requests (see e.g., operation 221 of process 200). The guest virtual machine may be part of a group or cluster of guest virtual machines. Accordingly, during activation of the guest virtual machine, the user may indicate the identities of other guest virtual machines in the group/cluster. Accordingly, a sensitive data control monitor of an associated virtual appliance machine (e.g., a sensitive data control monitor 313 of virtual appliance machine 109) updates the other guest virtual machines in the cluster so that their respective certificates refer to the current encryption keys for the shared sensitive data (some sensitive data may not be shared with the cluster, may be marked as such, and may utilize different encryption keys, which are not shared with the other machines in the cluster). The user may then begin using the guest virtual machine, whereupon the guest virtual machine may accumulate some sensitive data thereon (see e.g., operation 217 of process 200). This sensitive data may then be encrypted as described herein. Because the guest virtual machine is part of a cluster, a disc from the guest virtual machine may be moved into a second virtual machine in the cluster. Accordingly, the sensitive data is now automatically accessible from the second guest virtual machine in the cluster to where the disc has been moved. As the second guest virtual machine shares the same keys for the shared disc and is also running a sensitive data control agent, the sensitive data may be accessed on the second guest virtual machine.

The systems and methods described herein may also support reverting to an old snapshot of sensitive data for backup or restore purposes. For example, a user may request a guest virtual machine (e.g., guest virtual machine 107) from a cloud provider in a cloud environment (e.g., cloud environment 101). The cloud provider may instantiate or otherwise set up the guest virtual machine with a sensitive data control module (e.g., sensitive data control module 301) for the user (see e.g., operation 201 of process 200). The user may then activate the guest virtual machine (see e.g., operation 205 of process 200), which leads to the activation of a sensitive data runtime agent on the guest virtual machine (e.g., sensitive data runtime agent 309) which begins monitoring of data access attempts/requests (see e.g., operation 221 of process 200). The user may then begin using the guest virtual machine, whereupon the guest virtual machine may accumulate some sensitive data thereon (see e.g., operation 217 of process 200). This sensitive data may then be encrypted as described herein.

At some point, a snapshot (e.g., a backup) of the guest virtual machines disc may be taken. At a later point in time, the user may decide to revert back to the old snapshot and may initiate startup of the old snapshot. When the old snapshot starts, the sensitive data control module on the guest virtual machine may connect to a sensitive data control monitor of its associated virtual appliance machine (e.g., sensitive data control monitor 313 of virtual appliance machine 109). The sensitive data control module may then provide the sensitive data control monitor with the certificate for the guest virtual machine, whereupon the sensitive data control monitor provides the sensitive data control monitor with the encryption keys associated with the certificate. If the encryption keys have been updated in the sensitive data control monitor, the sensitive data control agent will receive both the old and the new encryption keys so that the sensitive data control agent can verify new keys first and fall back to the old keys if necessary to decrypt the sensitive data.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A method for providing sensitive data protection in a virtual computing environment, the method executed by a processing device configured to perform a plurality of operations, the method comprising:
    activating a guest virtual machine in the virtual computing environment, wherein the guest virtual machine comprises a local sensitive data control agent, wherein the guest virtual machine is associated with a virtual appliance machine that administers sensitive data controls for the virtual computing environment, and wherein the virtual appliance machine comprises a sensitive data control monitor;
    generating a certificate that uniquely identifies the guest virtual machine;
    identifying, at the sensitive data control monitor, a sensitive data protection policy for the guest virtual machine;
    associating, at the sensitive data control monitor, an encryption key with the certificate, wherein the encryption key is generated in accordance with the identified sensitive data protection policy; and
    passing the generated encryption key, the sensitive data protection policy, and the certificate from the virtual appliance machine to the guest virtual machine,
    wherein sensitive data stored by the guest virtual machine is encrypted on a virtual disc of the guest virtual machine using the generated encryption key and the sensitive data protection policy and encryption of the sensitive data is maintained when the guest virtual machine is deactivated.

2. The method of claim 1, further comprising:
   identifying, at the sensitive data control agent, the sensitive data stored by the guest virtual machine; and
   creating, by the sensitive data control agent, a sensitive data pool of the virtual disc, wherein the encrypted sensitive data is stored in the sensitive data pool.

3. The method of claim 2, wherein identifying sensitive data stored by the guest virtual machine further comprises receiving parameters for classification of sensitive data from a user of the guest virtual machine.

4. The method of claim 1, further comprising:
   identifying a data access attempt;
   determining whether the data access attempt is directed to the sensitive data;
   determining whether the data access attempt complies with the sensitive data protection policy when the data access attempt is directed to the sensitive data;
   obtaining the generated encryption key when the data access attempt complies with the sensitive data protection policy; and
   decrypting the sensitive data using the generated encryption key.

5. The method of claim 4, wherein obtaining the generated encryption key comprises:
   transmitting the certificate to the sensitive data control monitor; and
   receiving the generated encryption key from the sensitive data control monitor in response to the transmitted certificate, wherein the transmitted certificate is used to locate the generated encryption key.

6. The method of claim 4, wherein obtaining the generated encryption key includes locating the generated encryption key on the guest virtual machine.

7. The method of claim 1, wherein generating the encryption key associated with the certificate includes passing the certificate from the guest virtual machine to the virtual appliance machine prior to generating the encryption key.

8. A system to provide sensitive data protection in a virtual computing environment, the system comprising:
   a processing device configured to:
      activate a guest virtual machine in a virtual computing environment, wherein the guest virtual machine comprises a local sensitive data control agent, wherein the guest virtual machine is associated with a virtual appliance machine that administers sensitive data controls for the virtual computing environment, and wherein the virtual appliance machine comprises a sensitive data control monitor,
      generate a certificate that uniquely identifies the guest virtual machine,
      identify, at the sensitive data control monitor, a sensitive data protection policy for the guest virtual machine,
      associate, at the sensitive data control monitor, an encryption key with the certificate, wherein the encryption key is generated in accordance with the identified sensitive data protection policy, and
      pass the generated encryption key, the sensitive data protection policy, and the certificate from the virtual appliance machine to the guest virtual machine,
      wherein sensitive data stored by the guest virtual machine is encrypted on a virtual disc of the guest virtual machine using the generated encryption key and the sensitive data protection policy and encryption of the sensitive data is maintained when the guest virtual machine is deactivated.

9. The system of claim 8, wherein the processing device is further configured to:
   identify, at the sensitive data control agent, the sensitive data stored by the guest virtual machine; and
   create, by the sensitive data control agent, a sensitive data pool of the virtual disc, wherein the encrypted sensitive data is stored in the sensitive data pool.

10. The system of claim 9, wherein identification of sensitive data stored by the guest virtual machine further comprises reception of parameters for classification of sensitive data from a user of the guest virtual machine.

11. The system of claim 8, wherein the processing device is further configured to:
    identify a data access attempt,
    determine whether the data access attempt is directed to the sensitive data,
    determine whether the data access attempt complies with the sensitive data protection policy when the data access attempt is directed to the sensitive data,
    obtain the generated encryption key when the data access attempt complies with the sensitive data protection policy, and
    decrypt the sensitive data using the generated encryption key.

12. The system of claim 11, wherein the generated encryption key is obtained when the processing device transmits the certificate to the sensitive data control monitor and receives the generated encryption key from the sensitive date control monitor in response to the transmitted certificate, wherein the transmitted certificate is used to locate the generated encryption key.

13. The system of claim 11, wherein the generated encryption key is obtained when the processing device locates the generated encryption key on the guest virtual machine.

14. The system of claim 8, wherein generation of the encryption key associated with the certificate includes the certificate being passed from the guest virtual machine to the virtual appliance machine prior to generation of the encryption key.

15. A computer program product comprising:
    a non-transitory computer readable storage medium having computer readable program code embodied therewith, the computer readable program code comprising:
    computer readable program code configured to activate a guest virtual machine in a virtual computing environment, wherein the guest virtual machine comprises a local sensitive data control agent, wherein the guest virtual machine is associated with a virtual appliance machine that administers sensitive data controls for the virtual computing environment, and wherein the virtual appliance machine comprises a sensitive data control monitor;
    computer readable program code configured to generate a certificate that uniquely identifies the guest virtual machine;
    computer readable program code configured to identify, at the sensitive data control monitor, a sensitive data protection policy for the guest virtual machine;
    computer readable program code configured to associate, at the sensitive data control monitor, an encryption key with the certificate, wherein the encryption key is generated in accordance with the identified sensitive data protection policy; and
    computer readable program code configured to pass the generated encryption key, the sensitive data protection policy, and the certificate from the virtual appliance machine to the guest virtual machine, wherein sensitive data stored by the guest virtual machine is encrypted on a virtual disc of the guest virtual machine using the generated encryption key and the sensitive data protection policy and encryption of the sensitive data is maintained when the guest virtual machine is deactivated.

16. The computer program product of claim 15, further comprising:
   computer readable program code configured to identify, at the sensitive data control agent, the sensitive data stored by the guest virtual machine; and
   computer readable program code configured to create, by the sensitive data control agent, a sensitive data pool of the virtual disc, wherein the encrypted sensitive data is stored in the sensitive data pool.

17. The computer program product of claim 16, wherein identification of sensitive data stored by the guest virtual machine further comprises reception of parameters for classification of sensitive data from a user of the guest virtual machine.

18. The computer program product of claim 15, further comprising:
   computer readable program code configured to identify a data access attempt;
   computer readable program code configured to determine whether the data access attempt is directed to the sensitive data;
   computer readable program code configured to determine whether the data access attempt complies with the sensitive data protection policy when the data access attempt is directed to the sensitive data;
   computer readable program code configured to obtain the generated encryption key when the data access attempt complies with the sensitive data protection policy; and
   computer readable program code configured to decrypt the sensitive data using the generated encryption key.

19. The computer program product of claim 18, wherein the generated encryption key is obtained when the certificate is transmitted to the sensitive data control monitor and the generated encryption key is received from the sensitive date control monitor in response to the transmitted certificate; wherein the transmitted certificate is used to locate the generated encryption key.

20. The computer program product of claim 18, wherein the generated encryption key is obtained when the generated encryption key is located on the guest virtual machine.

21. The computer program product of claim 15, wherein generation of the encryption key associated with the certificate includes the certificate being passed from the guest virtual machine to the virtual appliance machine prior to generation of the encryption key.

* * * * *

UNITED STATES PATENT AND TRADEMARK OFFICE
CERTIFICATE OF CORRECTION

PATENT NO. : 8,700,898 B1
APPLICATION NO. : 13/633454
DATED : April 15, 2014
INVENTOR(S) : A. Korthny et al.

Page 1 of 1

It is certified that error appears in the above-identified patent and that said Letters Patent is hereby corrected as shown below:

In the Claims

Column 20, line 28 (claim 12, line 4), please change "sensitive date" to -- sensitive data --
Column 22, line 14 (claim 19, line 4), please change "sensitive date" to -- sensitive data --

Signed and Sealed this
Second Day of December, 2014

Michelle K. Lee
*Deputy Director of the United States Patent and Trademark Office*